United States Patent
White et al.

(10) Patent No.: US 7,584,900 B2
(45) Date of Patent: Sep. 8, 2009

(54) DRINKING STRAW WITH MULTI-APERTURED END

(75) Inventors: Francetta Jamese Estes White, Hilton Head Island, SC (US); David Lawrence White, Hilton Head Island, SC (US)

(73) Assignee: Hilton Head Container Company, LLC, Hilton Head Island, SC (US)

( * ) Notice: Subject to any disclaimer, the term of this patent is extended or adjusted under 35 U.S.C. 154(b) by 0 days.

(21) Appl. No.: 11/356,605

(22) Filed: Feb. 17, 2006

(65) Prior Publication Data

US 2006/0192025 A1 Aug. 31, 2006

Related U.S. Application Data

(60) Provisional application No. 60/653,721, filed on Feb. 17, 2005.

(51) Int. Cl.
*A47G 21/18* (2006.01)
(52) U.S. Cl. ............... 239/33; 239/24; 220/705; 215/388; D7/300.2
(58) Field of Classification Search ............ 239/1, 239/12, 24, 33; 220/703, 705–710; 446/200, 446/201; 420/85; 215/229, 388, 399; D7/200.2
See application file for complete search history.

(56) References Cited

U.S. PATENT DOCUMENTS

| 214,617 | A | * | 4/1879 | Brown ............... 239/33 |
| 580,527 | A | * | 4/1897 | Martin ............... 210/251 |
| 1,996,203 | A | | 4/1935 | Hollingsworth |
| 2,036,706 | A | | 4/1936 | Law |
| 2,139,838 | A | * | 12/1938 | Mayer ............... 131/243 |
| 2,395,734 | A | * | 2/1946 | Georgopoulos ....... 229/103.1 |
| 2,600,978 | A | | 6/1952 | DeMarco, Jr. |
| 2,975,925 | A | | 3/1961 | Chambers |
| 3,153,415 | A | | 10/1964 | Sheridan |
| 3,172,561 | A | | 3/1965 | Schwartz |
| 3,332,567 | A | * | 7/1967 | Pugh, Sr. ............ 215/388 |
| 3,384,257 | A | | 5/1968 | Fourqueran |
| D217,317 | S | | 4/1970 | Homorodean, Jr. et al. |
| 3,517,884 | A | * | 6/1970 | Horvath ............. 239/33 |
| 3,545,980 | A | * | 12/1970 | Stanger ............. 426/85 |
| 3,645,262 | A | | 2/1972 | Harrigan |
| 3,757,784 | A | | 9/1973 | Avery |
| 3,780,944 | A | | 12/1973 | Zubalik |
| 3,946,652 | A | * | 3/1976 | Gorin ............... 99/323 |
| 4,033,453 | A | * | 7/1977 | Giaimo .............. 206/217 |

(Continued)

FOREIGN PATENT DOCUMENTS

GB 2168622 A 6/1988

(Continued)

OTHER PUBLICATIONS www.hiltonheadcontainer.com.

*Primary Examiner*—Len Tran
*Assistant Examiner*—Jason J Boeckmann

(57) ABSTRACT

A reusable, disposable, or confectionery drinking straw includes a bulbous end portion having a plurality of apertures. The bulbous straw end portion is integral to the straw or it may be removably attached to the straw. The drinking straw device may include or be in the form of a bracelet. The bracelet portion is either integral to the straw or removably attached to the straw.

20 Claims, 6 Drawing Sheets

U.S. PATENT DOCUMENTS

| | | | |
|---|---|---|---|
| 4,095,710 A * | 6/1978 | Tomiati | 220/708 |
| 4,153,170 A | 5/1979 | Aquarian | |
| 4,191,302 A | 3/1980 | Fiducia | |
| 4,247,016 A * | 1/1981 | Shaw | 220/708 |
| 4,356,927 A * | 11/1982 | Cooper et al. | 220/710 |
| D269,659 S | 7/1983 | Holloway | |
| 4,463,859 A | 8/1984 | Greene | |
| 4,505,310 A | 3/1985 | Schneider | |
| D279,250 S | 6/1985 | Holloway | |
| 4,573,631 A * | 3/1986 | Reeves | 229/404 |
| 4,629,098 A | 12/1986 | Eger | |
| 4,728,001 A * | 3/1988 | Serba | 220/705 |
| 4,795,028 A * | 1/1989 | Wittig et al. | 206/217 |
| 4,813,933 A | 3/1989 | Turner | |
| 4,830,204 A * | 5/1989 | Lin | 215/389 |
| 4,898,290 A | 2/1990 | Cueto | |
| 4,966,580 A | 10/1990 | Turner et al. | |
| 4,969,564 A | 11/1990 | Cohen et al. | |
| 4,994,076 A | 2/1991 | Guss | |
| 5,040,719 A * | 8/1991 | Ballway | 220/738 |
| 5,048,705 A | 9/1991 | Lynd et al. | |
| 5,049,127 A | 9/1991 | Yen Tseng | |
| 5,057,077 A | 10/1991 | Turner et al. | |
| 5,105,956 A | 4/1992 | Tarng-Lin | |
| 5,148,971 A | 9/1992 | Ahn | |
| 5,150,811 A * | 9/1992 | Kelston | 220/710 |
| 5,215,231 A | 6/1993 | Paczonay | |
| 5,221,016 A | 6/1993 | Karpal | |
| 5,234,117 A | 8/1993 | Garvin | |
| 5,353,983 A * | 10/1994 | Miller | 229/103.1 |
| 5,388,712 A | 2/1995 | Brody | |
| 5,398,853 A | 3/1995 | Latham | |
| D360,558 S | 7/1995 | Appleman | |
| 5,439,125 A | 8/1995 | Bloch | |
| 5,462,101 A | 10/1995 | Mouchmouchian | |
| 5,478,325 A | 12/1995 | Fu-Hsiang | |
| 5,509,605 A | 4/1996 | Cripe | |
| 5,525,383 A * | 6/1996 | Witkowski | 428/30 |
| D378,975 S | 4/1997 | Reid | |
| 5,682,931 A | 11/1997 | Mouchmouchian | |
| 5,693,033 A | 12/1997 | Nita | |
| D392,886 S * | 3/1998 | Yanes | D9/436 |
| 5,722,219 A * | 3/1998 | Dobransky | 53/461 |
| 5,749,483 A | 5/1998 | Tebeau | |
| 5,873,474 A | 2/1999 | Gray | |
| D407,946 S | 4/1999 | Brewer et al. | |
| 5,890,636 A | 4/1999 | Kibbe | |
| D425,756 S | 5/2000 | Lipson | |
| 6,076,967 A | 6/2000 | Beaudette | |
| 6,109,515 A | 8/2000 | Duboff | |
| 6,109,538 A | 8/2000 | Villani et al. | |
| 6,126,679 A | 10/2000 | Botts | |
| 6,158,155 A | 12/2000 | Boney | |
| 6,168,042 B1 * | 1/2001 | Kalagian | 220/705 |
| 6,431,434 B1 | 8/2002 | Haughton et al. | |
| 6,460,777 B2 | 10/2002 | Float et al. | |
| 6,561,434 B2 * | 5/2003 | Kaplan | 239/33 |
| 6,565,899 B1 | 5/2003 | Cecere | |
| 6,652,144 B2 | 11/2003 | Stefandl | |
| D487,375 S | 3/2004 | Bengtsson et al. | |
| 6,732,882 B2 | 5/2004 | Belcastro | |
| 6,739,933 B2 | 5/2004 | Taylor | |
| 6,824,003 B1 | 11/2004 | Wong | |
| 7,021,490 B2 * | 4/2006 | Lipson | 220/709 |
| 7,172,085 B2 | 2/2007 | Beaudette | |
| 2002/0090423 A1 * | 7/2002 | Shecter | 426/104 |
| 2003/0042324 A1 | 3/2003 | Ho | |
| 2003/0087005 A1 | 5/2003 | Baron | |
| 2003/0203075 A1 | 10/2003 | Taylor | |
| 2003/0232111 A1 | 12/2003 | Sanso | |
| 2004/0013772 A1 | 1/2004 | Weiss et al. | |
| 2004/0045169 A1 | 3/2004 | Boettner et al. | |
| 2004/0069862 A1 | 4/2004 | Sheedy | |
| 2004/0137139 A1 | 7/2004 | Diamond et al. | |
| 2004/0245257 A1 * | 12/2004 | Lipson | 220/709 |
| 2004/0256015 A1 | 12/2004 | Margetson | |
| 2005/0037112 A1 | 2/2005 | Daley et al. | |
| 2006/0076252 A1 | 4/2006 | Witkowski | |
| 2006/0175248 A1 | 8/2006 | Raimondo et al. | |

FOREIGN PATENT DOCUMENTS

| | | |
|---|---|---|
| GB | 2198622 A | 6/1988 |
| GB | 2198622 A * | 6/1988 |
| JP | 2004-024408 | 1/2004 |

* cited by examiner

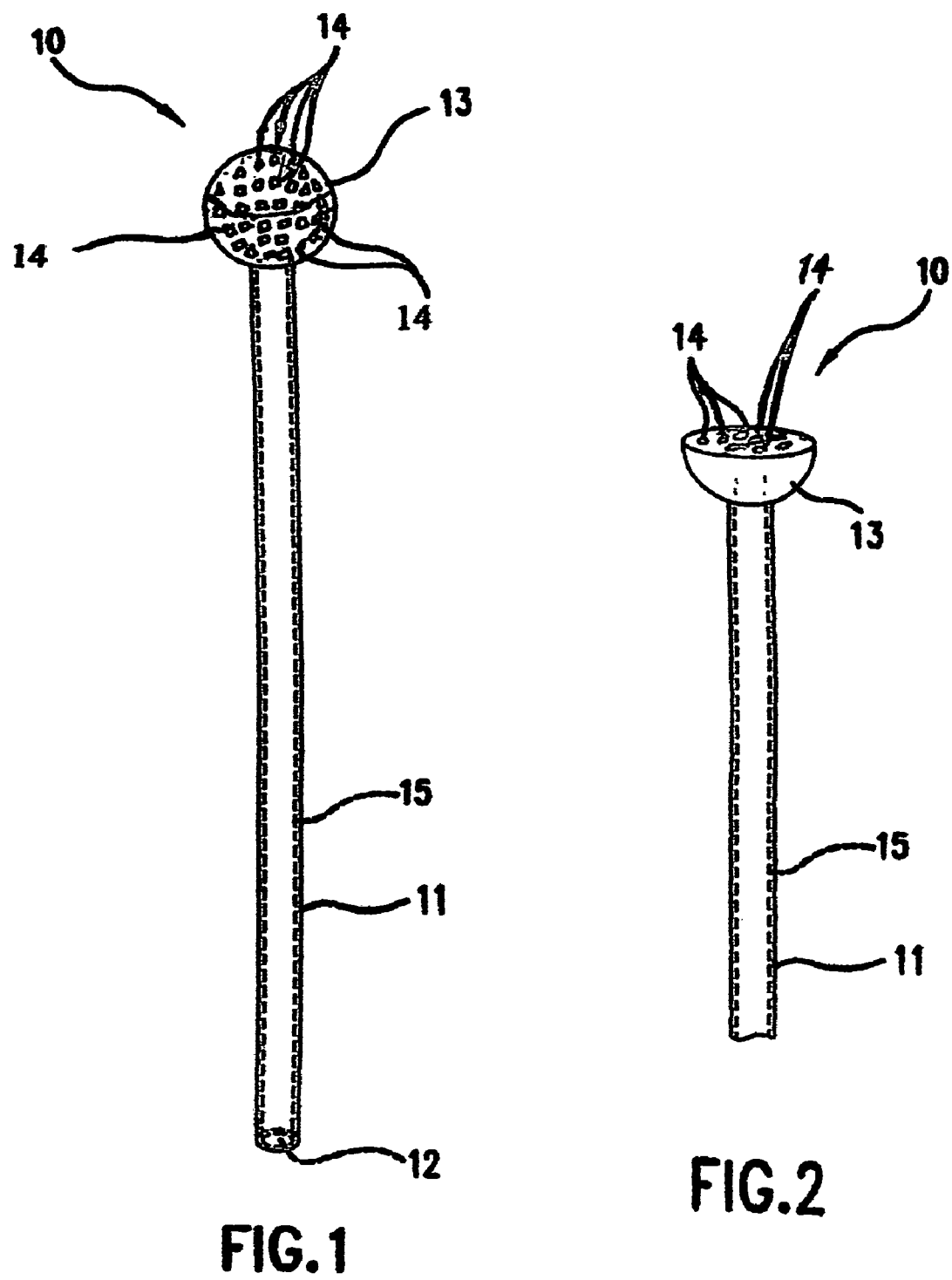

DRINKING STRAW WITH MULTI-APERTURED END

CROSS REFERENCE TO RELATED DOCUMENT

Benefit is claimed under 35 USC 119(e) of provisional U.S. patent application Ser. No. 60/653,721, filed on Feb. 17, 2005.

BACKGROUND OF THE INVENTION

1. Technical Field

The present device relates generally to a reusable, disposable, or confectionery drinking straw with an enlarged or bulbous end, the bulbous end portion having a plurality of apertures.

2. Background Information

There have been many attempts to develop novel ways to imbibe liquids with a drinking straw. Drinking straws have in the past been sold separately from the container, or they are attached to, and purchased with, a beverage container.

In their simplest configuration, drinking straws are freestanding, simple vertical tubes. In more complex configurations, drinking straws are freestanding, ornamental straws that spiral, loop, or bend in ways that draw the user's attention to the flow of the contents through the straw as the beverage is sipped. A drawback of the more complex straws is that they are difficult to clean and may be unsanitary.

In other configurations, a straw with a movable extension, usually made of plastic, is built into a beverage container. The user pulls up the straw from the cap of the container and extracts the contents. The straw is stored by replacing the top of the straw back into its horizontal position in the cap of the container.

In yet other configurations, the drinking straw is purchased with the container, but is removable from the container. The container is designed to allow the straw to fit through a hole in the container. This straw remains in a near vertical position when in use or in storage. In some of these configurations, the straw has a removable cap molded around a base of the straw that can fit over the straw. The removable cap for the straw is designed to snap onto the straw when the straw is not in use, so as to keep the straw clean.

The drinking straw device of the current invention can be used to imbibe the contents of a beverage from either end of the straw. However, when the bulbous end of the drinking straw device of the current invention is placed in the beverage, the straw also can be an excellent mechanism for stirring the beverage.

As the user sips from the straw of the current invention, the rush of liquid to the palate through strategically-placed or randomly-placed apertures in the bulbous end portion of the straw device provides a new experience for users, who receive a novel burst (meaning a single stream of liquid breaks apart to become a multiple stream) of liquid that is exciting, yet sensually pleasing to the palate.

The drinking straw of the current invention can be made from any suitable fibrous or non-fibrous material, such as metal, hard or flexible tubing, plastic, resin, and paper. The present invention can be manufactured for use separately, or can be manufactured for use as an integral part of a container.

As a separately purchased straw device, the present invention can become a standard piece of cutlery used in formal or informal indoor and outdoor dining settings, depending upon the material used for manufacturing the device. Sterling silver, stainless steel, or other metals are the preferable material for use in formal and informal indoor dining settings. One advantage of the current invention is that in its simplest and most elegant configuration, it can be cleaned and sanitized for reuse in a fashion similar to other cutlery.

The straw of the current invention is also suitable for use as a new confection. Lollipops are solid, hard candy or they contain "treats" that have been stored within the body cavity of the candy. With the current invention, the straw is made of lollipop confection of any flavor. The instant confectionery straw can itself flavor a beverage through which the user sips the liquid.

In the confectionery form of the current invention, the drinking straw can be entirely edible, or only partially edible, depending upon the composition of the materials used to support the confection. The normally jaded lollipop user will have a novel confection that also can be used in a new and different way—to increase their pleasurable drinking experience as the device dissolves into, and blends with, their favorite beverage.

Children will be delighted to carry their own private drinking straws of the present invention, which are shaped in the form of a bracelet. The drinking straw bracelet is preferably made of a pliable material, such as plastic, that can be flexed to form a serpentine configuration around the child's arm. The enlarged end of the novelty drinking straw is preferably in a child-attractive shape, such as a bird, dolphin, fruit, flower, or cartoon character. In this configuration, the straw can be made from single or multiple colors for carrying and use, for example, at amusement parks. The drinking straw of the current invention also would be suitable as a party favor, for example, at a child's birthday party.

BRIEF SUMMARY OF THE INVENTION

The present invention is a straw device comprising a first end portion having a single aperture connecting to a central bore within the first end portion, and an opposite, bulbous end portion. The bulbous end portion has a plurality of apertures, which may be same sized or vary in size. The enlarged, or bulbous, end portion may be in the shape of a geometric, animal, fruit, flower, mineral, vegetable, or cartoon shape, or any object. The drinking straw device is optionally attached to or in the form of a bracelet.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein:

FIG. 1 is a perspective view of a drinking straw device according to the present invention;

FIG. 2 is a perspective view of a drinking straw device according to the present invention;

DETAILED DESCRIPTION OF THE INVENTION

Figure 3:
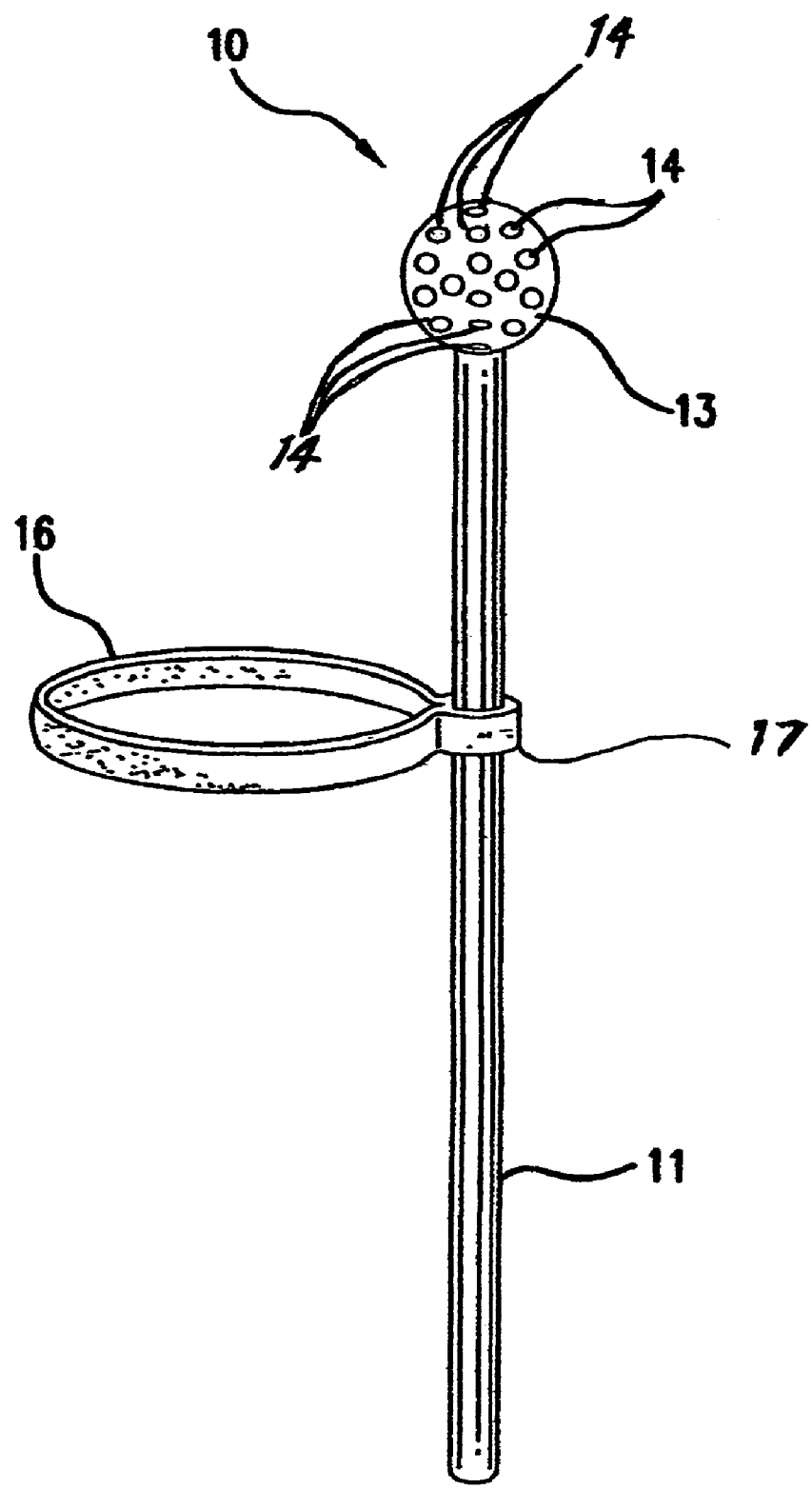
FIG. 3 is a perspective view of a drinking straw device according to the present invention, showing an attached bracelet.

In the following description, like reference characters designate like or corresponding parts throughout the several views. Also, in the following description, it is to be understood that such terms as "inside", "outside", "within", and the like are words of convenience and are not to be construed as limiting terms. Referring in more detail to the drawings, the invention will now be described.

Referring to FIGS. 1 and 2, a drinking straw device 10 includes a first end portion 11 comprising a single first end aperture 12 connecting to a central bore 15 that extends within the first end portion 11, and an opposite, bulbous end portion 13 connected to the an end of the first end portion 11 and the single first end aperture 12. The bulbous end portion 13 comprises a plurality of apertures 14 of varying shapes and sizes (as measured by the circumference or perimeter of the aperture) along almost the entire surface of the object, allowing the liquid to flow in multiple streams in all directions within the mouth of the user. FIG. 2 shows a drinking straw device 10 where the bulbous end portion 13 is hemi-spherical in shape with eight bulbous end apertures 14 on a planar surface of the hemi-spherical bulbous end portion 13. Also in FIG. 2, it can be seen that the eight (multiple) bulbous end apertures 14 are irregular (amorphous) in shape, are of different sizes, and are placed randomly, providing yet a new experience for users who receive a novel burst of liquid to the palate. The bulbous end apertures 14 may vary in size, or they may be about the same size as one another, they may be placed along any surface of the bulbous end portion as in FIG. 1, or on a specific surface as in FIG. 2. The bulbous end apertures 14 are preferably in direct, fluid communication with the central bore 15, so that beverage imbibed at one end of the straw device 10 flows through the hollow device to the other end. Each bulbous end aperture 14 may have a diameter less than about a third, more preferably less than about ¼, of the diameter of the first straw end aperture 12.

The bulbous end portion 13 may be hollow and globe-shaped, as shown in FIG. 1, or hollow and hemi-spherical in shape, as shown in FIG. 2. The enlarged, or bulbous, end portion 13 may be in the shape of a geometric, animal, fruit, flower, mineral, vegetative, or cartoon shape, or any object. The first end portion 11 may be substantially straight, as shown in FIG. 1, substantially serpentine in shape as in FIG. 6 and FIG. 8, or it may be bent into any other suitable shape that still allows fluid to pass through the central bore 15. The central bore 15 may have a consistent inside diameter, or the inside diameter of the central bore may taper off at either end. The inside diameter of the central bore 15 may be equal to, greater than, or less than the inside diameter of the first end aperture 12. The outside diameter of the first end portion 11 may vary. The bulbous end portion 13 of the straw device 10 is alternatively removably attachable (e.g., detachable and reattachable) to the first end portion. When the straw device 10 is in use and the first end portion 11 is within the beverage in a drinking container, the beverage comes into direct fluid communication with an interior of the bulbous end portion 13 prior to coming into direct fluid communication with the user's mouth. The apertures 14 are distributed across any surface of the bulbous end portion, including both the upper (northern) and lower (southern) hemispheres of the bulbous end portion 13, as seen in the figures. The lower hemisphere is adjacent the first end portion below it. Where the bulbous end portion 13 is hemi-spherical in shape, the bulbous end apertures are in a planar end section of the hemi-spherical bulbous end portion.

The bulbous end portion 13 may be placed into the beverage, or it may be placed in the user's mouth, according to the user's preference. In the former case, the drinking straw device 10 can double as a stir stick. Where the bulbous end portion 13 is a confection, stirring it in the beverage imparts some of it to the surrounding fluid, particularly where the beverage is hot or warm in temperature. When a candy bulbous end portion 13 is in the mouth, the user's saliva will slowly dissolve the confection into the user's mouth, so the user receives both the taste of the beverage and the taste of the confection on his or her taste buds. Alternatively, the user may chose to suck on the candy bulbous end portion even without using it to imbibe a beverage.

As seen in FIGS. 1 and 2, the bulbous end portion 13 is connected to an end of the first end portion 11 opposite the single first end portion aperture 12. The plurality of bulbous end apertures 14 and the bulbous end portion 13 are in direct fluid communication with the central bore 15 and the first end portion 11 when the straw device 10 is in use. Referring to the bulbous end portion 13 of FIG. 1, thirty-two bulbous end apertures 14 in three different shapes—triangles, squares, and trapezoids—are shown randomly-placed along the viewable surface of a globe- or ball-like figure. FIG. 1 also shows bulbous end apertures 14 in different sizes. Referring now to FIG. 2, the drawing shows the multiple bulbous end apertures 14 having eight different amorphous shapes and sizes. Furthermore in FIG. 2, each shape is randomly-placed on the bulbous end portion 13. The single first end portion aperture 12 of FIG. 2 is in direct, uninterrupted fluid communication with the bulbous end portion 13, so that when the straw device is in use, a suction flow of a single stream of liquid up through the single first end portion aperture 12, through the central bore 15, through the bulbous end portion 13, and out through the eight bulbous end apertures 14 forms eight different streams of the liquid that passes out of the different shapes and sizes of the bulbous end apertures 14, creating a novel burst of liquid to the palate of the user. The positions (strategic or random placement) of the bulbous end apertures 14 may vary in other embodiments of the present invention, such as in FIGS. 3 and 4. When the bulbous end portion 13 is a confection, the suctioned flow of liquid up through the single first end portion aperture 12, the central bore 15, the bulbous end portion 13, and the bulbous end apertures 14 forms confection-flavored streams of the liquid that passes through the different shapes and sizes of the bulbous end apertures 14, the novelty of the burst of the confection-flavored liquid streams being created by the shape and size of the bulbous end apertures 14. The drinking straw device 10 can be made of a reusable material, such as plastic or stainless steel, or a disposable material, such as paper. The material contemplated for more formal and informal, novelty table or bar straws would be manufactured of stainless steel or other hard material suitable for dining or bar use, where the material can be cleaned and sanitized for reuse in a manner similar to other cutlery. The drinking straw device 10 can alternatively be made of a suitable candy material. The entire device may be completely edible or it may be partly edible. For example, the bulbous end portion 13 may be edible, and the first end portion 11 may be edible or not.

Figure 4:
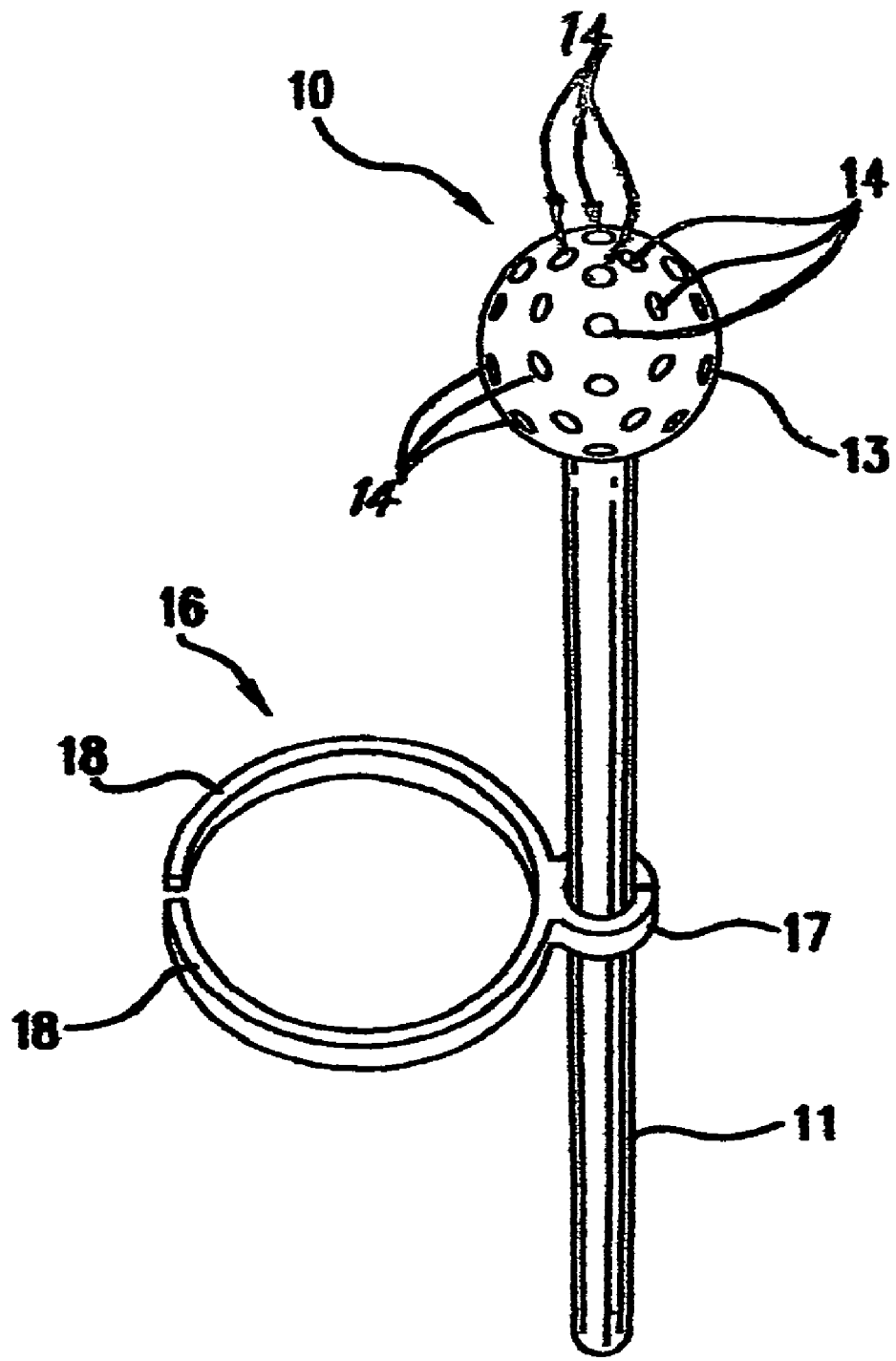
FIG. 4 is a perspective view of a drinking straw device according to the present invention, showing an attached bracelet.
Figure 5:
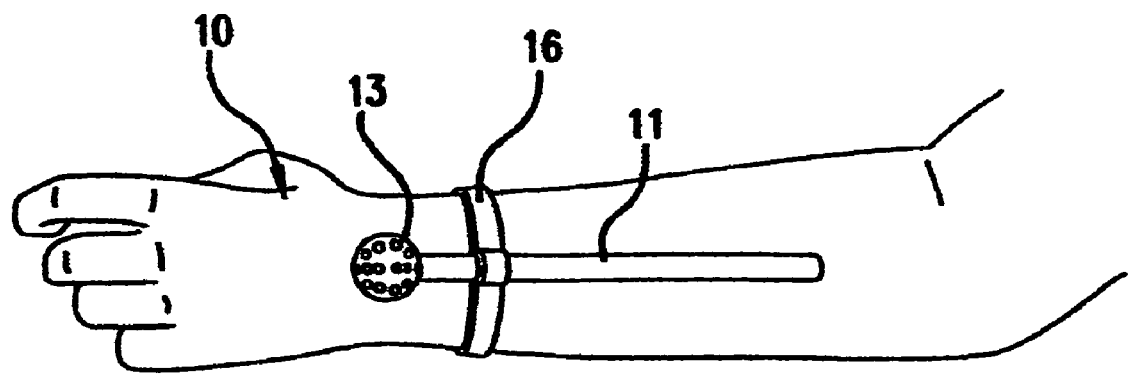
FIG. 5 is a perspective view of a drinking straw device according to the present invention, shown on a child's arm.
Figure 6:
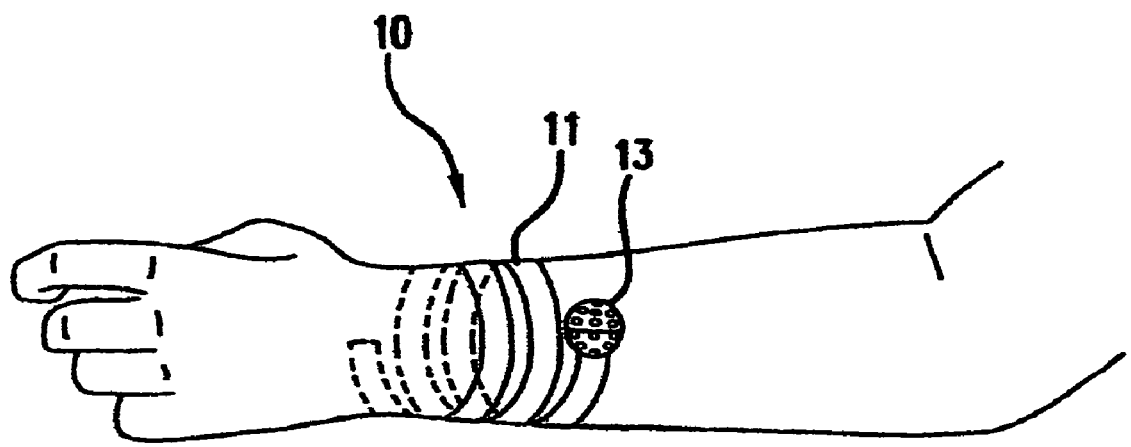
FIG. 6 is a perspective view of a drinking straw device according to the present invention, shown on a child's arm.
Figure 7:
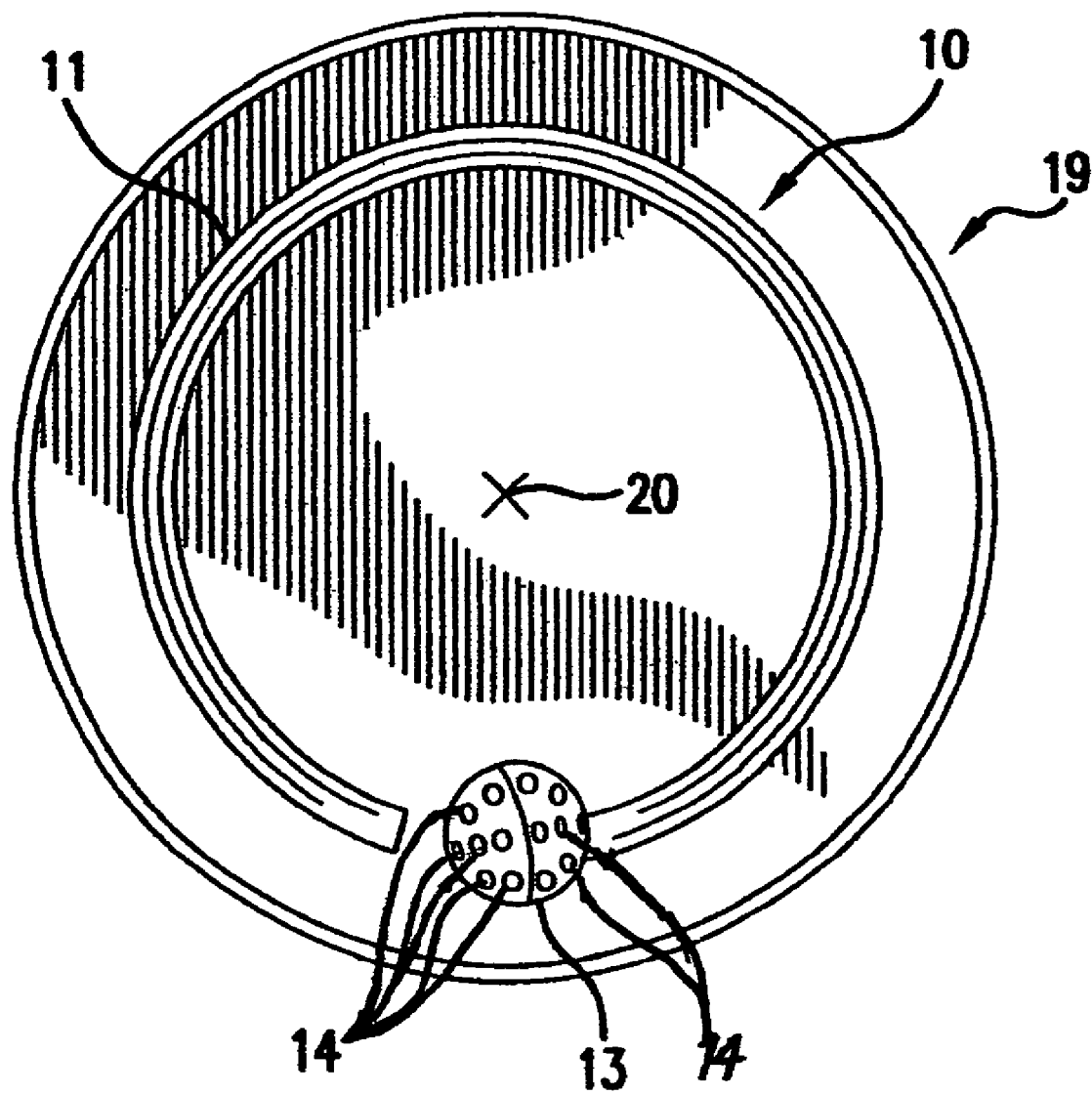
FIG. 7 and FIG. 8 are perspective views of a drinking straw device according to the present invention.
Figure 8:
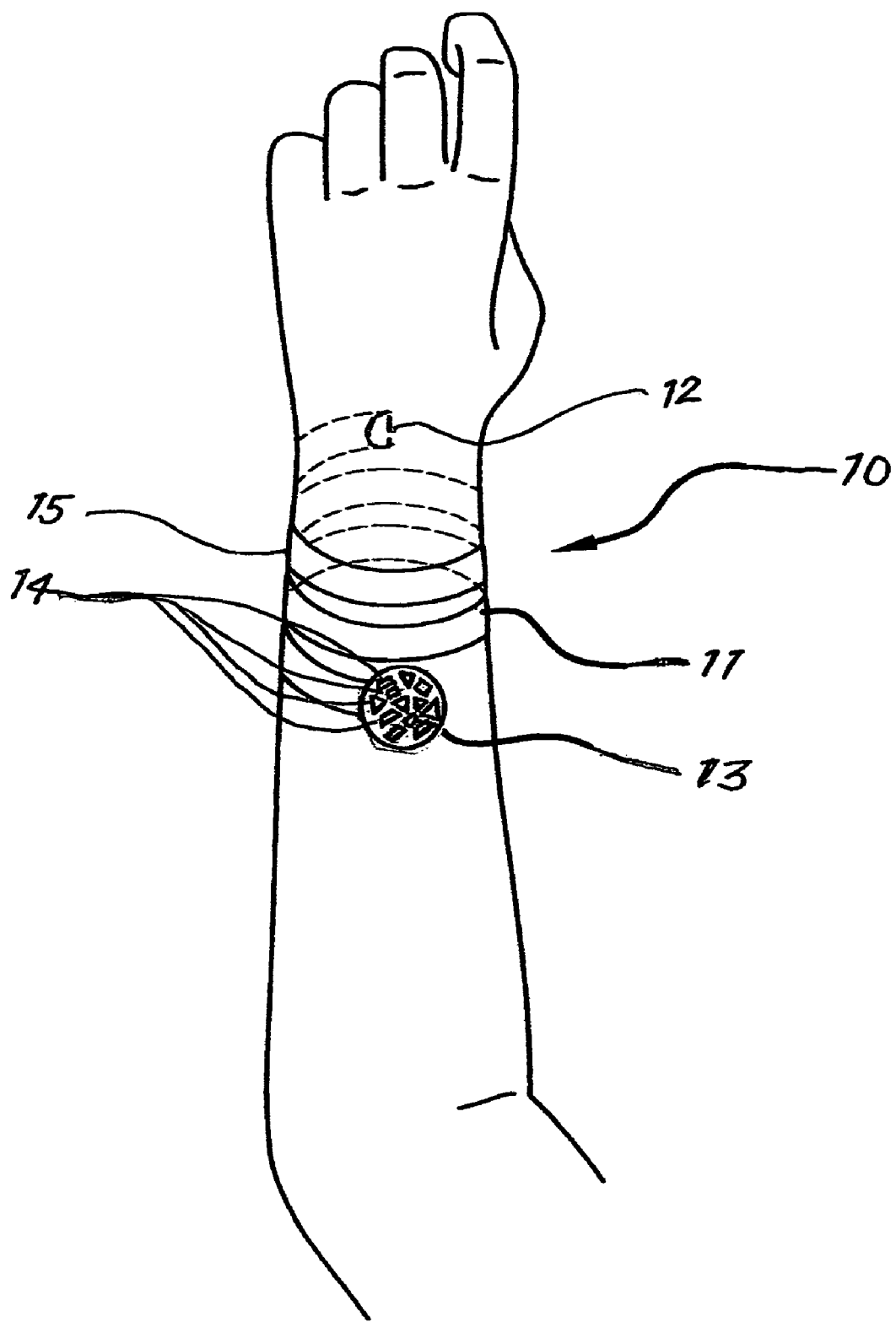

In other embodiments of the current straw device, it can be readily seen that the drinking straw device 10 of FIGS. 3, 4, 5, 6, and 7 shows a bulbous end portion 13 with a plurality of bulbous end apertures 14 in different shapes (circles, ellipses, ovals) and sizes. The bulbous end apertures 14 of FIGS. 4, 5, 6 and 7 are placed somewhat symmetrically on the surface of a golf ball-like object, with a plurality of the bulbous end apertures 14 placed along almost the entire surface of the bulbous end portion 13, including at the apex of the bulbous end portion 13 opposite the first end portion, and aligned in an azimuth-like fashion along the apex of the bulbous end portion 13. In FIG. 3, the plurality of bulbous end apertures 14, which total sixteen in the viewable area of the bulbous end portion 13, are shown in three different shapes—circles. ellipses, and ovals. It can be seen that the apertures vary in size and are randomly- or asymmetrically-placed over almost the entire surface of the bulbous end portion. Continuing with FIG. 3, the bulbous end portion 13 is connected to an end of the first end portion 11 opposite the single first end portion aperture. The plurality of bulbous end apertures 14 and the bulbous end portion 13 are in direct fluid communication with the central bore 15 and the first end portion 11 when the straw device 10 is in use, so that a suctioned flow of a liquid up through the single first end portion aperture, through the central bore, through the bulbous end portion, and out through the sixteen bulbous end apertures forms different streams of the liquid that passes through the sixteen bulbous end apertures. Also in FIG. 3, the straw device 10 is held in storage by a bracelet portion 16 that encircles the arm or wrist (not shown). The bracelet portion 16 is made preferably of a pliable material such as plastic, or of an edible material such as candy. Referring to FIG. 4, twenty-one bulbous end apertures 14 in three different shapes—circles, ovals and ellipses—are shown rather symmetrically-placed along the viewable surface of a globe- or ball-like figure. FIG. 4 also shows bulbous end apertures 14 in different sizes. Furthermore, in FIG. 4, the straw device 10 is held in storage by a bracelet portion 16 that encircles the arm or wrist (not shown). The bracelet portion 16 is made preferably of a pliable material such as plastic, or of an edible material such as candy. Referring to FIGS. 3 through 6, the drinking straw device 10 may be detachably attached to or in the form of a bracelet portion 16, until ready for use. The drinking straw device 10 of FIGS. 3-5 further comprises a detachable bracelet portion 16. The removable (detachable, reattachable) bracelet portion 16 in FIGS. 3-5 shows loops that are bendable to fit most children's wrists. In FIG. 4, the bracelet portion 16 includes a flexible bracelet clasp 17 that enclasps the straw device. Furthermore, in FIG. 3, the straw device 10 is held in storage by a bracelet portion 16 that encircles the arm or wrist (not shown). The bracelet portion 16 is made preferably of a pliable material such as plastic, or of an edible material such as candy. As shown in FIG. 3, the flexible bracelet portion 16 is integral and includes a larger loop for encircling the wrist or arm (wrist/arm not shown), and a smaller loop for encircling the straw device 10. In FIG. 4, it can be seen that the bracelet portion 16 is integrally formed with two matching bracelet arms 18 that flex to clasp around the wrist or arm (wrist/arm not shown). The bracelet portion 16 of FIG. 4 also shows an integrally-formed bracelet clasp 17 that holds the straw device 10 when the straw device is not in use. The flexible bracelet clasp 17, then, allows the straw device 10 to be detachably attached, i.e., the user may retain, remove, and replace the straw device 10 in the bracelet portion 16. Looking at FIG. 5, which is a view of FIG. 3 while detachably attached to a wrist/arm, it can be seen that the bracelet portion 16 encircles the wrist, so that the attached straw device 10 extends parallel to the upper arm, for example. The drinking straw device 10 can be made integrally of a bendable material so that it can be formed into a spiral around the wrist, as shown in FIG. 6, with a golf ball-shaped bulbous end portion 13 on the wrist. The drinking straw device 10, as shown in FIGS. 1-8, including the bracelet portion 16 can be made of an edible confection or other material. In FIG. 4, the bracelet portion 16 is attached to the drinking straw by a flexible bracelet clasp 17 of the bracelet portion 16. Also in FIG. 4, two matching bracelet arms 18 of the bracelet portion 16 flex to clasp around the wrist or other part of the user's arm (not shown). The bulbous end portion 13 is preferably in a design, or in geometric, animal, fruit, flower, mineral, vegetable, or cartoon shapes, or in the shape of any objects. In a preferred embodiment herein, the drinking straw device 10 is a confection, and the bulbous end portion 13 is in a shape of a fruit that corresponds to the flavor of the confection. In another preferred embodiment herein the drinking straw device is bendable as seen in FIG. 7. The bracelet may be integral to (one piece) the first end portion 11 and it may also be edible. The drinking straw device 10 is preferably itself a bracelet, with the first end portion 11 being substantially serpentine in shape as seen in FIG. 6 and FIG. 8. As in FIG. 3, FIG. 4, and FIG. 5, the bracelet portion 16 is preferably attachable to and detachable-from the unitary drinking straw device 10, the drinking straw device being functional for drinking upon detachment from the bracelet portion 16.

Referring to FIG. 7, a spiral, or coiled, drinking straw device 10 may be stored in a channel on a container or container lid 19, as shown in FIG. 7. The straw device may alternatively be attached by, for example, detachably adhering the straw device 10 using a suitable adhesive to the upper or lower surface of a container lid 19 or container. To use the coiled straw device 10, the user pulls it from the container lid 19, straightens it, fills the cup or other container with beverage, puts the container lid 19 on the container, and inserts either end 11, 13 of the straw device 10 through the lid slit 20 into the cup or other container (not shown). Where the user puts his or her mouth over the hollow globe-shaped end portion 13 of the straw device and sips the beverage, the beverage apertures 14 in the globe-shaped end portion 13 create a novel burst of liquid that is pleasing to the palate, especially for juvenile users. Referring to FIG. 8, the drinking straw device 10 is preferably itself a bracelet, with the first end portion 11 being serpentine or spiral in shape. The bulbous end portion 13 is connected to an end of the first end portion 11 opposite the single first end portion aperture 12. The plurality of bulbous end apertures 14 are shown randomly-placed along the viewable surface of a ball-like figure. Referring to the bulbous end portion 13 of FIG. 8, twelve bulbous end apertures 14 in three different shapes—triangles, squares, and trapezoids—are shown randomly-placed along the viewable surface of a ball-like figure. FIG. 8 also shows bulbous end apertures 14 in different sizes. The bulbous end portion 13 of FIG. 8 is in direct fluid communication with the central bore 15 and the first end portion 11 when the straw device 10 is in use.

From the foregoing it can be realized that the described device of the present invention may be easily and conveniently utilized as a drinking straw. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording. of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A drinking straw device comprising a first end portion, the first end portion comprising a single first end portion aperture connecting to a central bore, the straw device further comprising an opposite, bulbous end portion connected to an end of the first end portion opposite the single first end portion aperture, the hollow, bulbous end portion comprising a plurality of bulbous end apertures on the bulbous end portion, the plurality of bulbous end apertures and the bulbous end portion being in direct fluid communication with the central bore and the first end portion when the straw device is in use, the plurality of bulbous end apertures comprising different shapes and sizes of the bulbous end apertures, wherein the different shapes consisting of triangles, squares, and trapezoids.

2. The drinking straw device according to claim 1, the drinking straw device being a confection that is at least partially edible.

3. The drinking straw device according to claim 2, wherein, when the straw device is in use, a suctioned flow of a liquid up through the single first end portion aperture, the central bore, the bulbous end portion, and out through the plurality of bulbous end apertures forms a plurality of confection-flavored streams of the liquid that passes through the different bulbous end apertures.

4. The drinking straw device according to claim 2, wherein each of the bulbous end apertures has a diameter less than about one third of the diameter of the first straw end aperture.

5. The drinking straw device according to claim 2, wherein the drinking straw device is bendable.

6. The drinking straw device according to claim 2, comprising a first end portion, the first end portion comprising a single first end portion aperture connecting to a central bore, the straw device further comprising an opposite, bulbous end portion connected to the first end portion, the bulbous end portion being interchangeably detachable and reattachable to the opposite end of the first end portion.

7. The drinking straw device according to claim 2, wherein the drinking straw device is a spiral bracelet.

8. The drinking straw device according to claim 2, wherein the drinking straw device is itself a bracelet, the first end portion being substantially serpentine in shape.

9. The drinking straw device according to claim 1, wherein, the first end portion is substantially serpentine in shape, the single first end portion aperture being in direct fluid communication with the bulbous end portion; wherein, when the straw device is in use, a suctioned flow of a liquid up through the single first end portion aperture, through the central bore, through the bulbous end portion, and out through the plurality of bulbous end apertures forms a plurality of different streams of the liquid that passes through the different bulbous end apertures.

10. A drinking straw device according to claim 1, comprising a first end portion, the first end portion comprising a single first end portion aperture connecting to a central bore, the straw device further comprising an opposite, bulbous end portion connected to the first end portion, the bulbous end portion being interchangeably detachable and reattachable to the opposite end of the first end portion.

11. The drinking straw device according to claim 1, wherein the drinking straw device is itself a bracelet, the first end portion being substantially serpentine in shape.

12. The drinking straw device according to claim 11, wherein the bracelet is integral to the first end portion.

13. The drinking straw device according to claim 1, further comprising a bracelet portion, the bracelet portion comprising a bendable arm for encircling an arm, the bracelet portion further comprising a bracelet clasp, the bracelet portion being attachable to and detachable from the unitary drinking straw device, the drinking straw device being functional for drinking upon detachment from the bracelet portion clasp.

14. The drinking straw device according to claim 13, wherein the bracelet portion is edible.

15. The drinking straw device according to claim 13, wherein the bracelet portion is bendable and further comprises a set of bendable matching arms for encircling an arm.

16. The drinking straw device according to claim 13, wherein the bracelet portion is bendable and further comprises a set of bendable matching arms for encircling an arm, the bracelet portion being edible.

17. The drinking straw device according to claim 1, wherein the drinking straw device is a spiral bracelet.

18. The drinking straw device according to claim 1, wherein the drinking straw device is a confection, and the bulbous end portion is in a shape of a fruit that corresponds to the flavor of the confection.

19. The drinking straw device according to claim 1, wherein each of the bulbous end apertures has a diameter less than about one-third of the diameter of the first straw end aperture.

20. The drinking straw device according to claim 1, wherein the drinking straw device is bendable.

* * * * *